United States Patent
Lee et al.

(10) Patent No.: US 10,949,013 B2
(45) Date of Patent: Mar. 16, 2021

(54) ELECTRONIC DEVICE AND TOUCH INPUT SENSING METHOD OF ELECTRONIC DEVICE

(71) Applicant: Samsung Electronics Co., Ltd., Gyeonggi-do (KR)

(72) Inventors: Jeongjin Lee, Seoul (KR); Youngho Cho, Seoul (KR); Iljoo Chae, Gyeonggi-do (KR); Changhee Hong, Gyeonggi-do (KR); Mooyoung Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/319,738

(22) PCT Filed: Jul. 21, 2017

(86) PCT No.: PCT/KR2017/007919
§ 371 (c)(1),
(2) Date: Jan. 22, 2019

(87) PCT Pub. No.: WO2018/016924
PCT Pub. Date: Jan. 25, 2018

(65) Prior Publication Data
US 2019/0278416 A1    Sep. 12, 2019

(30) Foreign Application Priority Data
Jul. 22, 2016  (KR) .......................... 10-2016-0093281

(51) Int. Cl.
*G06F 3/041*    (2006.01)

(52) U.S. Cl.
CPC ............ *G06F 3/0414* (2013.01); *G06F 3/041* (2013.01); *G06F 3/0416* (2013.01);
(Continued)

(58) Field of Classification Search
CPC ...... G06F 3/0414; G06F 3/041; G06F 3/0416; G06F 2203/04105; G06F 3/04144; G06F 2203/04106
See application file for complete search history.

(56) References Cited

U.S. PATENT DOCUMENTS

| 2011/0063248 A1 | 3/2011 | Yoon |
| 2014/0035849 A1 | 2/2014 | Jung et al. |

(Continued)

FOREIGN PATENT DOCUMENTS

| JP | 2015-127874 | * 7/2015 | ............ G06F 3/041 |
| JP | 2015127874 | 7/2015 | |

(Continued)

OTHER PUBLICATIONS

PCT/ISA/210 Search Report issued on PCT/KR2017/007919 (pp. 5).

(Continued)

*Primary Examiner* — Jonathan A Boyd
(74) *Attorney, Agent, or Firm* — The Farrell Law Firm, P.C.

(57) ABSTRACT

A touch input sensing method of an electronic device can comprise the steps of: determining whether a first input device sensed a touch input before a second input device sensed the same; performing a command such that the second input device collects pressure information in a raw data mode, if the first input device sensed the touch input before the second input device sensed the same; allow the second input device to collect the pressure information according to the command; generating a pressure table by using the collected pressure information; and mapping the pressure table and coordinate information sensed by the first input device, so as to transmit the coordinate information and the pressure information to an AP.

14 Claims, 10 Drawing Sheets

(52) U.S. Cl.
CPC ............... *G06F 3/04144* (2019.05); *G06F 2203/04105* (2013.01); *G06F 2203/04106* (2013.01)

(56) References Cited

U.S. PATENT DOCUMENTS

| | | | |
|---|---|---|---|
| 2014/0098058 A1* | 4/2014 | Baharav ............... | G06F 3/0421 345/174 |
| 2015/0091859 A1 | 4/2015 | Rosenberg et al. | |
| 2015/0296062 A1 | 10/2015 | Lee | |
| 2016/0274728 A1 | 9/2016 | Luo et al. | |
| 2016/0328067 A1 | 11/2016 | Aoki et al. | |
| 2017/0336899 A1 | 11/2017 | Szeto | |

FOREIGN PATENT DOCUMENTS

| | | | |
|---|---|---|---|
| KR | 1020110028834 | 3/2011 | |
| KR | 101145155 | 5/2012 | |
| KR | 101145155 B1 * | 5/2012 | ............ H01H 36/00 |
| KR | 1020130004636 | 1/2013 | |
| KR | 1020130060716 | 6/2013 | |
| KR | 1020140017351 | 2/2014 | |
| KR | 1020150068330 | 6/2015 | |
| KR | 1020150117958 | 10/2015 | |
| WO | WO 2016/065482 | 5/2016 | |

OTHER PUBLICATIONS

PCT/ISA/237 Written Opinion issued on PCT/KR2017/007919 (pp. 7).
European Search Report dated Jun. 19, 2019 issued in counterpart application No. 17831396.1-1231, 10 pages.

\* cited by examiner

ELECTRONIC DEVICE AND TOUCH INPUT SENSING METHOD OF ELECTRONIC DEVICE

PRIORITY

This application is a National Phase Entry of PCT International Application No. PCT/KR2017/007919 which was filed on Jul. 21, 2017, and claims priority to Korean Patent Application No. 10-2016-0093281, which was filed on Jul. 22, 2016, the content of each of which is incorporated herein by reference.

TECHNICAL FIELD

Various embodiments of the present invention relate to a method for processing information about touch input sensed through plural touch input units and to an electronic device supporting the method.

BACKGROUND ART

Processors are being developed that support a variety of electronic devices such as smartphones, tablet personal computers, portable multimedia players (PMP), personal digital assistants (PDA), laptop personal computers, and wearable devices.

Such an electronic device may include, as a touch input unit, at least one of a touch sensor capable of recognizing the coordinates of a touch of the user and a pressure sensor capable of measuring the pressure of the touch.

DISCLOSURE OF INVENTION

Technical Problem

The pressure sensor can sense not only the magnitude of pressure exerted by a touch input but also the coordinates of the touch input. In the related art, the coordinates of a touch input sensed through the touch sensor and the coordinates of the touch input sensed through the pressure sensor are mapped, synchronized, and reported to the application processor (AP). However, the pressure sensor has lower accuracy with respect to the touch input than the touch sensor. Here, the touch input coordinates transmitted by the touch sensor and the touch input coordinates transmitted by the pressure sensor are synchronized at the same time without prioritization, causing problems such as inaccuracy of coordinates, delay in coordinate synchronization, and failure to recognize the number of fingers at a multi-touch input.

The present invention has been made in view of the above problem. Accordingly, an aspect of the present invention is to provide a method for processing information received from touch input units while changing the priority therebetween according to the operational states and an electronic device supporting the method.

Solution to Problem

In accordance with an aspect of the present invention, there is provided a method of touch input sensing for an electronic device. The method may include: determining whether a first input unit has sensed a touch input earlier than a second input unit; sending, if the first input unit has sensed a touch input earlier than the second input unit, a command to the second input unit to collect pressure information in a raw data mode; collecting pressure information via the second input unit according to the command; generating a pressure table using the collected pressure information; and mapping the pressure table and coordinate information sensed by the first input unit, and transmitting the coordinate information and the pressure information to an application processor (AP).

In accordance with another aspect of the present invention, there is provided an electronic device. The electronic device may include: a first input unit; a second input unit; an application processor (AP); and an input and output subsystem. The input and output subsystem may be configured to: determine whether the first input unit has sensed a touch input earlier than the second input unit; send, if the first input unit has sensed a touch input earlier than the second input unit, a command to the second input unit to collect pressure information in a raw data mode; control the second input unit to collect pressure information according to the command; generate a pressure table using the collected pressure information; and map the pressure table and coordinate information sensed by the first input unit and transmit the coordinate information and the pressure information to the AP.

Advantageous Effects of Invention

In a feature of the present invention, the touch input sensing method enables the electronic device to change the priority between the touch input units according to the operational state of the electronic device while processing information received from the touch input units. Hence, it is possible to improve recognition of touch input coordinates, improve recognition of multi-touch input, and reduce the coordinate synchronization time.

MODE FOR THE INVENTION

Figure 1:
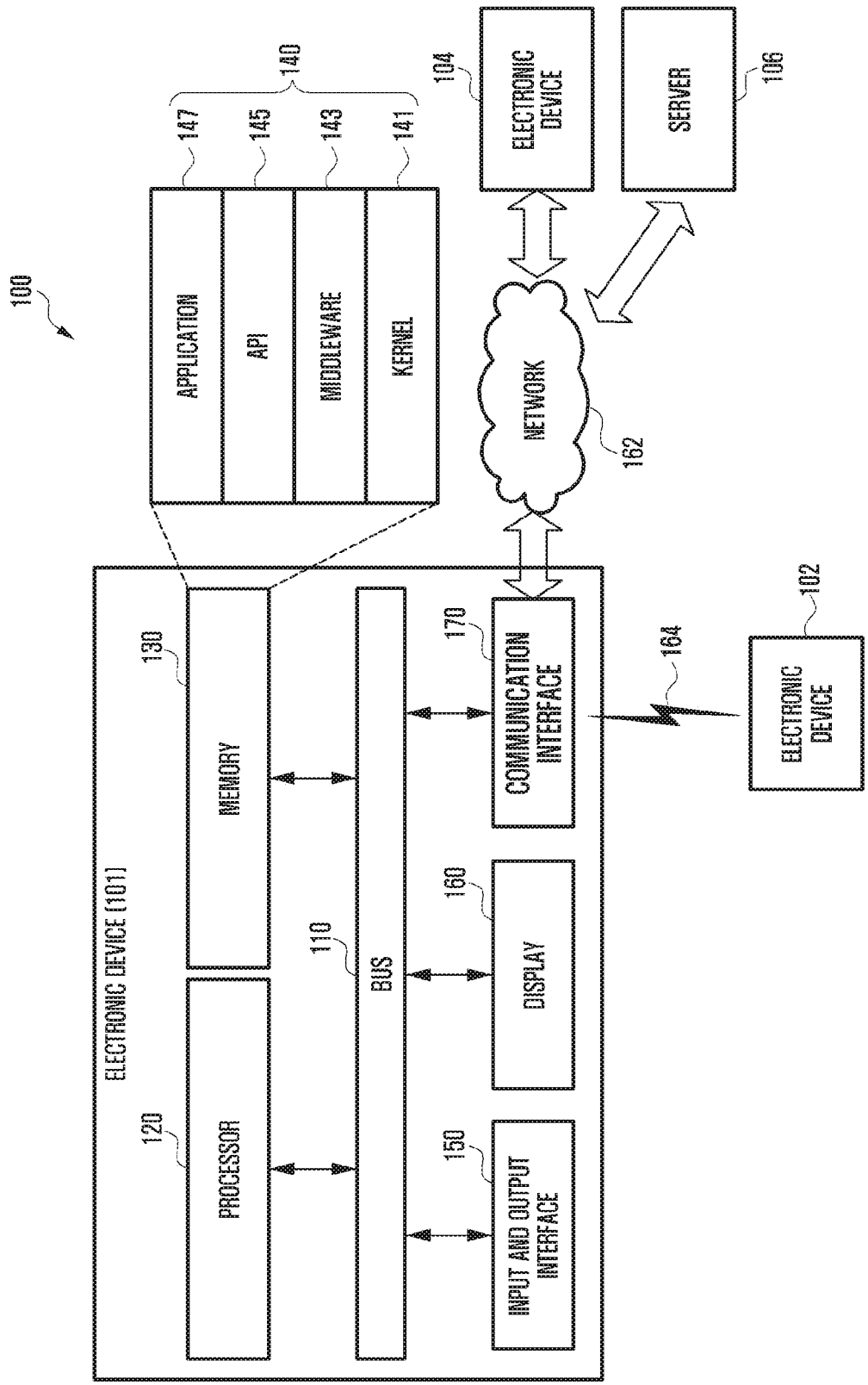
FIG. 1 illustrates electronic devices in a network environment according to various embodiments of the present invention.

Hereinafter, various embodiments of the present document will be described with reference to the accompanying drawings. The various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral. Singular forms are intended to include plural forms unless the context clearly indicates otherwise. In this document, the expressions such as "A or B" or "at least one of A and/or B" may include any or all of combinations of words listed together. The expression "1", "2", "first", or "second" used in various embodiments of the present disclosure may modify various components of the various embodiments but does not limit the corresponding components. When it is stated that a component is "coupled to" or "connected to" another component, the component may be directly coupled or connected to another component or a new component may exist between the component and another component.

In the present document, depending on the situation, the expression such as "~configured to" can be used interchangeably with "~suitable for", "having ~the ability to", "~changed to", "~made to", "capable of~", or "designed to~" in hardware or software. In some situations, the expression such as "a device configured to~" may mean that the device is capable of "doing with" other devices or components. For example, the phrases "a processor configured to (or, configured to) perform a, b, and c" may mean that a dedicated processor (e.g., embedded processor) for performing the corresponding operation or a general purpose processor (e.g., CPU or application processor) capable of performing the operations by executing one or more software programs stored in the memory device.

An electronic device according to various embodiments of the present document may include various devices such as, for example, smart phones, tablet PCs, mobile phones, videophones, electronic book readers, desktop PCs, laptop PCs, netbook computers, workstations, a server, a PDA, a portable multimedia player (PMP), an MP3 player, a medical device, a camera, or a wearable device. A wearable device may include at least one of an accessory type such as a watch, a ring, a bracelet, a necklace, a pair of glasses, a contact lens or a head-mounted-device (HMD), a fabric or a garment integral type (e.g., electronic garment), a body attachment type (e.g., a skin pad or a tattoo), or a bio implantable circuit. According to some embodiments, the electronic device may include, for example, at least one of a television, a digital video disk (DVD) player, an audio player, a refrigerator, an air conditioner, a vacuum cleaner, an oven, a microwave oven, a washing machine, an air cleaner, a set top box, a home automation control panel, a media box (e.g, Samsung HomeSync™, Apple TV™, or Google TV™), a game console (e.g., Xbox™, PlayStation™), an electronic dictionary, an electronic key, a camcorder, or an electronic frame.

In another embodiment, the electronic device may include at least one of any of a variety of medical devices (for example, various portable medical measurement devices (e.g., a blood glucose meter, a heart rate meter, a blood pressure meter or a temperature measuring device), a magnetic resonance angiography (MRA), a magnetic resonance imaging (MRI), computed tomography (CT), an imaging device, or an ultrasonic device), navigation devices, global navigation satellite system (GNSS), event data recorder (EDR), flight data recorder (FDR), automobile infotainment device, marine electronic devices (e.g., marine navigation devices, gyro compass, etc.), avionics, security devices, car head units, industrial or home robots, drones, ATMs at financial institutions, points of sale (POS) of stores or Internet Of Things devices (e.g., a light bulb, various sensors, a sprinkler device, a fire alarm, a thermostat, a streetlight, a toaster, a fitness device, a hot water tank, a heater, a boiler, etc.). According to some embodiments, the electronic device may include at least one of a piece of furniture, a building/structure, a part of an automobile, an electronic board, an electronic signature receiving device, a projector, or a variety of measuring devices (e.g., Gas, or radio wave measuring instruments, etc.). In various embodiments, the electronic device is flexible or may be a combination of two or more of the various devices described above. The electronic device according to the embodiment of the present document is not limited to the above-described devices. In this document, the term "user" used in various embodiments may refer to a person who uses an electronic device or a device (for example, an artificial intelligence electronic device) which uses an electronic device.

FIG. 1 illustrates a network environment 100 including an electronic device 101 according to various embodiments of the present disclosure. The electronic device 101 includes a bus 110, a processor 120, a memory 130, a input/output interface 150, a display 160 and a communication interface 170. According to some embodiments, the electronic device 101 may omit at least one of the components, or may additionally comprise other components. The bus 110 may be a circuit connecting the above described components 110 to 170 and transmitting communication (for example, a control message or data) between the above described components. The processor 120 may include one or more of a central processing unit (CPU), an application processor (AP), or a communications processor (CP). The processor 120 may execute operations or data processing related to control and/or communicate at least one the other components of the electronic device (101).

The memory 130 may include volatile and/or non-volatile memory. For example, the memory 130 may store instructions or data related to at least one other component of the electronic device 101. According to one embodiment, the memory 130 may store software and/or programs 140. For example, the program 140 may include a kernel 141, a middleware 143, an application programming interface (API) 145, and/or an application program (or application) 147. At least one of the kernel 141, middleware 143, or API 145 may be referred to as an operating system. For example, the kernel 141 controls or manages system resources (e.g., bus 110, processor 120, or memory 130, etc.) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests by using a method of assigning a priority. For example, the middleware 143 performs a control for the operation requests by using a method of assigning a priority by which system resources (for example, the bus 110, the processor 120, the memory 130 and the like) of the electronic device 100 can be used, to the application 147. The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user or external device, and transfer the received command and/or data to the components of the electronic device 101. The input/output interface 150 can output the received command and/or data to the components of the user or the external device.

The display 160 may include a display device such as a liquid crystal display (LCD), a light emitting diode (LED) display, an organic light emitting diode (OLED) display, or a microelectromechanical system (MEMS) display, or an electronic paper display. The display 160 may display various content (e.g., text, images, video, icons, and/or symbols, etc.) to a user. The display 160 may include a touch screen and may receive a touch, gesture, proximity, or hovering input using an electronic pen or a portion of a user's body. The communication interface 170 connects communication between the electronic device 100 and the external device (e.g., electronic device 102, 104 or server 106). For example, the communication interface 170 may access a network 162 through wireless or wired communication to communicate with the external device (e.g., the second electronic device 104 or server 106).

The wireless communication may include, for example, at least one of LTE, LTE-A (LTE Advance), code division multiple access (CDMA), wideband CDMA (WCDMA), universal mobile telecommunications system (UMTS), WiBro System for Mobile Communications). According to one embodiment, the wireless communication may include, for example, at least one of wireless fidelity (WiFi), Bluetooth, Bluetooth low power (BLE), Zigbee, near field communication, Magnetic Secure Transmission, Frequency (RF), or body area network (BAN). According to one example, wireless communication may include Global navigation satellite system (GNSS). For example, the GNSS may be a Global Positioning System (GPS), a Global Navigation Satellite System (Glonass), a Beidou Navigation Satellite System (Beidou), or a Galileo, the European global satellite-based navigation system. Hereinafter, the term 'GPS' can be used interchangeably with the term 'GNSS' in this document. The wired communication may include, for example, at least one of a universal serial bus (USB), a high definition multimedia interface (HDMI), a recommended standard 232 (RS-232), a power line communication, or a plain old telephone service (POTS). The network 162 may include at least one of a telecommunications network, a computer network (e.g., LAN or WAN), the Internet, or a telephone network Each of the first and second external electronic devices 102 and 104 may be the same or a different kind of device as the electronic device 101. According to various embodiments, all or a portion of the operations performed in the electronic device 101 may be performed in another electronic device or multiple electronic devices (e.g., electronic devices 102, 104, or server 106). According to one embodiment, in the event that the electronic device 101 has to perform certain functions or services automatically or upon request, the electronic device 101 may request other devices to perform at least some of the functions associated therewith instead of performing the function or service itself. Other electronic devices (e.g., the electronic devices 102 and 104, or server 106) may execute the requested function or additional function and transmit the results to electronic device 101. The electronic device 101 can directly or additionally process the received result to provide the requested function or service. For this purpose, for example, cloud computing, distributed computing, or client-server computing technology may be used.

Figure 2:
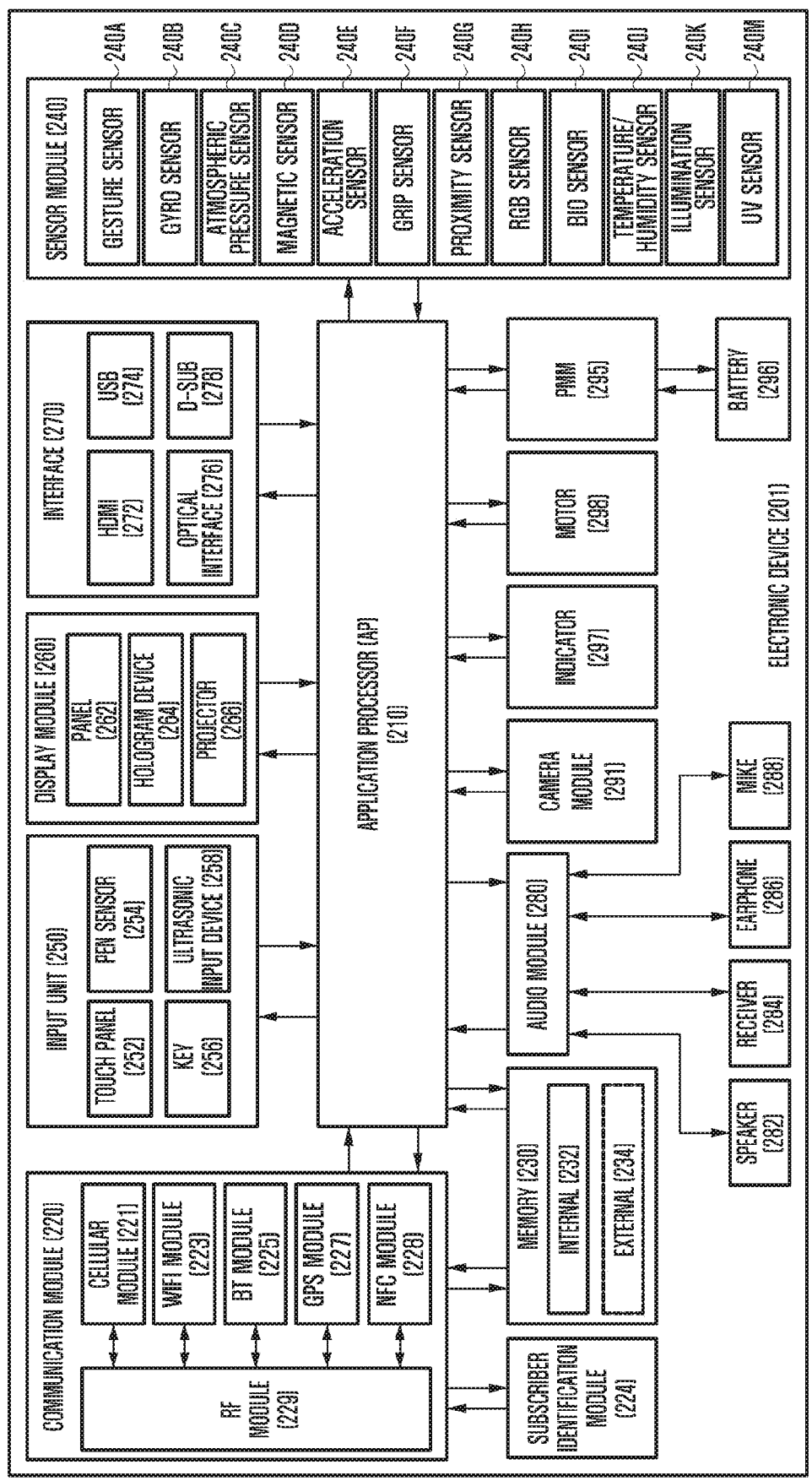
FIG. 2 is a block diagram of an electronic device according to various embodiments of the present invention.

FIG. 2 is a block diagram of an electronic device 201 according to various embodiments of the present disclosure. The electronic device 201 may configure, for example, a whole or a part of the electronic device 101 illustrated in FIG. 1. The electronic device 201 includes one or more processors (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. For example, the processor 210 may operate an operating system (OS) or an application program to control a plurality of hardware or software components connected to the processor 210, and may perform various data processing and operations. The processor 210 may be implemented by, for example, a system on chip (SoC). According to an embodiment, the processor 210 may further include a graphics processing unit (GPU) and/or an image signal processor. The processor 210 may include at least some of the components shown in FIG. 2 (e.g., cellular module 221). The processor 210 may load and process instructions or data received from at least one of the other components (e.g., non-volatile memory) and store the processed data in non-volatile memory.

May have the same or similar configuration as communication module 220 (e.g., communication interface 170). The communication module 220 may include, for example, a cellular module 221, a WiFi module 223, a Bluetooth module 225, a GNSS module 227, an NFC module 228 and an RF module 229 have. The cellular module 221 may provide, for example, voice calls, video calls, text services, or Internet services through a communication network. According to an embodiment, the cellular module 221 may distinguish and authenticate the electronic device 201 within the communication network by using the subscriber identity module (e.g., a SIM card) 224. According to an embodiment, the cellular module 221 performs at least some of the functions which can be provided by the processor 210. According to one embodiment, the cellular module 221 may include a communications processor (CP). At least some (e.g., two or more) of the cellular module 221, the WiFi module 223, the Bluetooth module 225, the GNSS module 227, or the NFC module 228 may be included in one integrated chip (IC) or IC package according to one embodiment. The RF module 229 transmits/receives data, for example, an RF signal. The RF module 229 may include, for example, a transceiver, a Power Amp Module (PAM), a frequency filter, a Low Noise Amplifier (LNA) or the like. According to another embodiment, at least one of the cellular module 221, the WiFi module 223, the Bluetooth module 225, the GNSS module 227, or the NFC module 228 transmits/receives an RF signal through a separate RF module. The SIM card 224 is a card including a Subscriber Identification Module or an embedded SIM. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a dynamic Random Access Memory (DRAM), a static RAM (SRAM), a synchronous dynamic RAM (SDRAM), and the like), and a non-volatile Memory (for example, a one time programmable Read Only Memory (OTPROM), a programmable ROM (PROM), an erasable and programmable ROM (EPROM), an electrically erasable and programmable ROM (EEPROM), a mask ROM, a flash ROM, a NAND flash memory, a hard drive, a solid state drive (SSD). The external memory 234 may include a flash drive, for example, a Compact Flash (CF), a Secure Digital (SD), a Micro Secure Digital (Micro-SD), a Mini Secure Digital (Mini-SD), an extreme Digital (xD), a multimedia card (MMC), or a memory stick. The external memory 234 may be functionally connected to the electronic device 201 through various interfaces.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240. According to some embodiments, to control the sensor module 240 while the processor 210 is in the sleep state, the electronic device 201 further includes a processor configured as part of the processor 210 or a processor that is separately configured from the processor 210.

The input device 250 may include, for example, a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. The touch panel 252 may further include a tactile layer. In this event, the touch panel 252 provides a tactile reaction to the user. For example, the (digital) pen sensor 254 may be part of the touch panel or may include a separate recognition sheet. The key 256 may include, for example, a physical button, an optical key, or a keypad. The ultrasonic input device 258 is a device which can detect an acoustic wave by a microphone (for example, microphone 288) of the electronic device 200 through an input means generating an ultrasonic signal to identify data and can perform wireless recognition.

The display 260 (for example, display 160) includes a panel 262, a hologram device 264, and a projector 266. The panel 262 may be implemented to be, for example, flexible, transparent, or wearable. The panel 262 may be configured by the touch panel 252 and one module. According to an embodiment, the panel 262 may include a pressure sensor (or force sensor) capable of measuring the intensity of the pressure on the user's touch. The pressure sensor may be integrated with the touch panel 252 or may be implemented by one or more sensors separate from the touch panel 252. The hologram device 264 shows a stereoscopic image in the air by using interference of light. The projector 266 projects light on a screen to display an image. For example, the screen may be located inside or outside the electronic device 200. The interface 270 may include, for example, an HDMI 272, a USB 274, an optical interface 276, or a D-sub (D-subminiature) 278. The interface 270 may be included, for example, in the communication interface 170 shown in FIG. 1. Additionally or alternatively, the interface 270 may include, for example, a mobile high-definition link (MHL) interface, an SD card/multimedia card (MMC) interface, or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like. The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp). The power managing module 295 manages power of the electronic device 200. The power managing module 295 may include, for example, a Power Management Integrated Circuit (PMIC), a charger Integrated Circuit (IC), or a battery or fuel gauge. The PMIC may have a wired and/or wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added. The battery gauge measures, for example, a remaining quantity of the battery 296, or a voltage, a current, or a temperature during charging. The battery 296 may include a rechargeable battery or a solar battery.

The indicator 297 shows particular statuses of the electronic device 201 or a part (for example, the processor 210) of the electronic device 201, for example, a booting status, a message status, a charging status and the like. The motor 298 converts an electrical signal to a mechanical vibration, and can generate vibration, haptic effects, and the like. The electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), mediaFlo™ or the like. Each of the components described in this document may be composed of one or more components, and the name of the component may be changed according to the type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
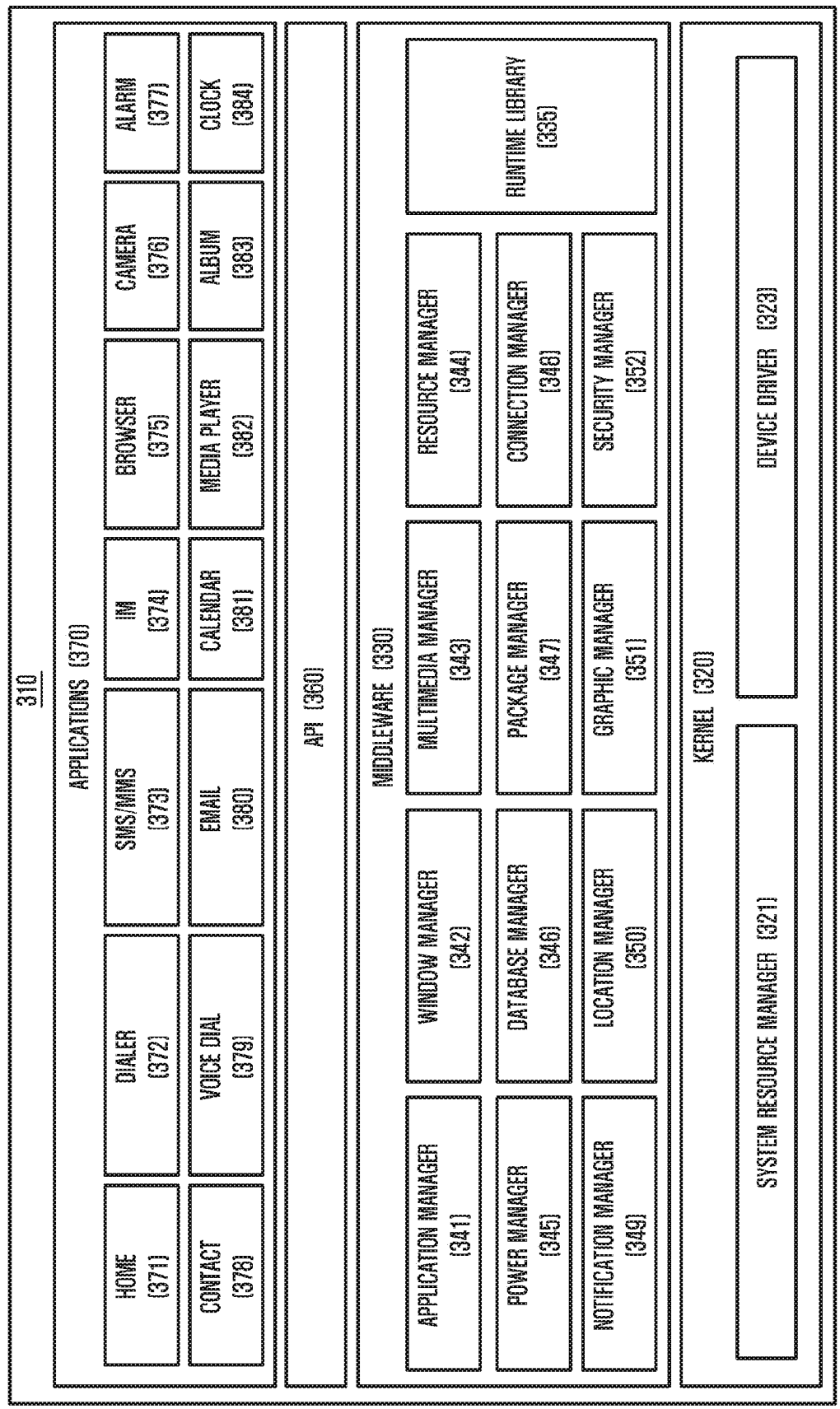
FIG. 3 is a block diagram of program modules according to various embodiments of the present invention.

FIG. 3 is a block diagram of a programming module according to an embodiment. The programming module 310 may include an Operating System (OS) controlling resources related to the electronic device (for example, electronic device 101) or various applications (for example, applications 370) driving on the OS. For example, the OS may be Android™, iOS™, Windows™, Symbian™, Tizen™, Bada™ or the like. Referring to FIG. 3, the programming module 310 includes a kernel 320, a middleware 330, an Application Programming Interface (API) 360, and applications 370. At least a portion of the program module 310 is preloaded on the electronic device or downloadable from an external electronic device (e.g., electronic device 102, 104, server 106, etc.).

The kernel 320 (for example, kernel 141) includes a system resource manager 321 and a device driver 323. The system resource manager 321 performs a system resource control, allocation, and recall. According to an embodiment, the system resource manager 321 may include, for example, a process manager, a memory manager, and a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver. The middleware 330 provides various functions through the API 360 to allow the application 370 to provide a function required in common by the applications 370, or use limited system resources within the electronic device. According to an embodiment, the middleware 310 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370. The power manager 345 may manage, for example, the capacity or power of the battery and provide the power information necessary for the operation of the electronic device. According to an embodiment, the power manager 345 operates together with a Basic Input/Output System (BIOS) The database manager 346 manages generation, search, and change of a database to be used by at least one of the applications 370. The package manager 347 manages an installation or an update of an application distributed in a form of a package file.

The connection manager 348 manages, for example, a wireless connection. The notification manager 349 displays or notifies a user of an event such as an arrival message, an appointment, a proximity alarm or the like. The location manager 350 may manage, for example, location information of the electronic device. The graphic manager 351 may manage a graphic effect provided to the user or a user interface related to the graphic effect. The security manager 352 provides a general security function required for a system security or a user authentication. According to an embodiment, the middleware 330 may include a telephony manager for managing a voice of the electronic device or a video call function. The middleware 330 may provide a module specified for each type of operating system to provide a differentiated function. The middleware 330 may dynamically delete some of the conventional components or add new components. The API 360 (for example, API 145) is a set of API programming functions, and may be provided with a different configuration according to an operating system. For example, in Android or iOS, a single API set may be provided for each platform. In Tizen, two or more API sets may be provided.

The applications 370 may include a home application 371, a dialer application 372, a Short Messaging Service (SMS)/Multlimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, a clock application 384, a healthcare (e.g., measuring exercise or blood sugar) application, or an environmental information (e.g., pressure, humidity, or temperature information) application. According to an embodiment, the application 370 may include an information exchange application capable of supporting the exchange of information between the electronic device and the external electronic device. The information exchange application may include, for example, a notification relay application for communicating specific information to an external electronic device, or a device management application for managing an external electronic device. For example, the notification relay application may transmit notification information generated in another application of the electronic device to an external electronic device, or may receive notification information from an external electronic device and provide the notification information to the user. The device management application may, for example, install, delete, or update the functions such as turning on/off the external electronic device itself (or some component) or adjusting the brightness (or resolution) of the display of the external electronic device of an external electronic device that communicates with the electronic device, or an application that operates on the external electronic device. 예 According to an embodiment, the application 370 may include an application (e.g., a healthcare application of a mobile medical device) designated according to the attributes of the external electronic device. According to an embodiment, the application 370 may include an application received from an external electronic device. At least some of the program modules 310 may be implemented (e.g., executed) in software, firmware, hardware (e.g., processor 210), or a combination of at least two of the same, and may comprise modules, programs, routines, instruction sets or processes for performing one or more functions.

Figure 4:
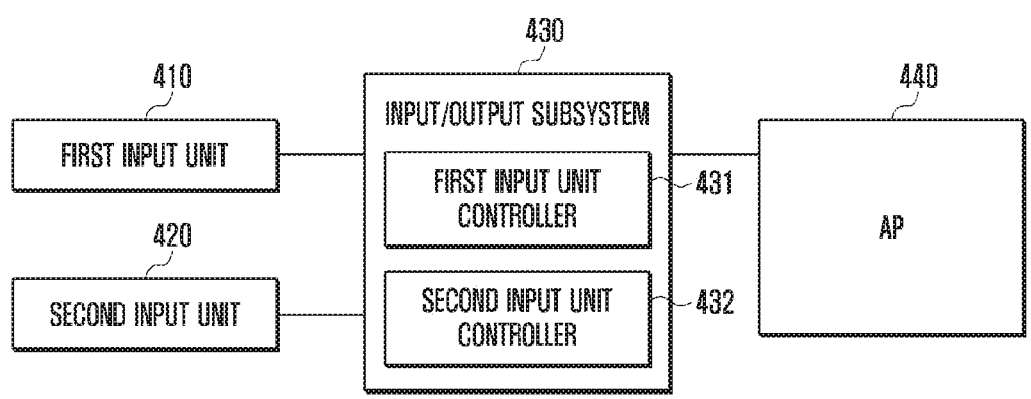
FIG. 4 is a block diagram of an electronic device according to various embodiments of the present invention.

FIG. 4 is a block diagram of an electronic device 400 according to various embodiments of the present invention.

The electronic device 400 may be identical to the electronic device 101 of FIG. 1 or the electronic device 201 of FIG. 2.

The electronic device 400 may include a first input unit 410, a second input unit 420, an input/output subsystem 430, and an application processor (AP) 440. The input/output subsystem 430 may include a first input unit controller 431 and a second input unit controller 432.

The electronic device 400 may collect coordinate information and pressure information about the touch input through at least one of the first input unit 410 and the second input unit 420. The first input unit 410 and the second input unit 420 can transmit coordinate information and pressure information about the touch input to the input/output subsystem 430.

The first input unit 410 may be a touch panel including a touch sensor. For example, the first input unit 410 may use at least one of a capacitive technology, a resistive technology, an infrared technology, and an ultrasonic technology. The first input unit 410 may be identical to the touch panel 252 in FIG. 2. The first input unit 410 can sense not only coordinate information of the touch input but also area information of the touch input.

The electronic device 400 may include a display (not shown, e.g., the display 260 in FIG. 2). The first input unit 410 may be composed of the display of the electronic device 400 and one or more modules.

The second input unit 420 may be a panel including a pressure sensor (or, force sensor). The second input unit 420 having a panel including a pressure sensor (or, force sensor) may be identical to the pressure sensor in FIG. 2. The second input device 420 having a panel including a pressure sensor (or, force sensor) may be implemented as a single body with the first input unit 410, or may be implemented separately from the first input unit 410.

The first input unit 410 and/or the second input unit 420 may collect coordinate information and/or pressure information on the touch input using an interrupt or polling scheme.

The input/output subsystem 430 may be electrically coupled with the first input unit 410, the second input unit 420, and the AP 440. The input/output subsystem 430 may transmit coordinate information and/or pressure information received from the first input unit 410 or the second input unit 420 to the AP 440. The input/output subsystem 430 may transmit mode information or a command to the first input unit 410 or the second input unit 420 so as to control the operation of the first input unit 410 or the second input unit 420 for collecting coordinate information and/or pressure information. The first input unit 410 or the second input unit 420 may collect coordinate information and/or pressure information according to the mode information or command received from the input/output subsystem 430.

The input/output subsystem 430 can classify the touch input received from the first input unit 410 and the second input unit 430. Specifically, the input/output subsystem 430 may determine whether the touch input received from the first input unit 410 and the second input unit 430 includes pressure information, does not include pressure information, or includes pressure information lower than a threshold value.

The input/output subsystem 430 may map the coordinate information of the touch input received from the first input unit 410 to the pressure information received from the second input unit 420. The input/output subsystem 430 may produce the pressure information based on the mapping between the coordinate information and the pressure information of the touch input and the area information. The input/output subsystem 430 may forward the produced pressure information to the AP 440.

The first input unit controller 431 may be electrically connected with the first input unit 410, the second input unit controller 432, and the AP 440. The first input unit controller 431 may collect coordinate information related to the touch input sensed by the first input unit 410. The first input unit controller 431 may synchronize the coordinate information collected by the first input unit 410 with the coordinate information and/or the pressure information about the touch input collected by the second input unit 420 and received via the second input unit controller 432, and forward the synchronized information to the AP 440. The first input unit controller 431 may generate a pressure table based on the pressure information collected by the second input unit 420 and received via the second input unit controller 432. The pressure table may contain pressure information corresponding to the node or electrode of the second input unit 420. The first input unit controller 431 may find the coordinate information corresponding to the pressure table and transmit it to the AP 440. The first input unit controller 431 may find the coordinate information collected by the first input unit 410 corresponding to the pressure table and transmit the coordinate information and/or the pressure information to the AP 440.

The first input unit controller 431 can receive not only the coordinate information of the touch input but also the area information of the touch input from the first input unit 410. The first input unit controller 431 can forward the coordinate information or the area information of the touch input received from the first input unit 410 to the AP 440.

The first input unit controller 431 can produce the pressure information based on the coordinate information and the area information of the touch input received from the first input unit 410 and forward the produced pressure information to the AP 440.

The first input unit controller 431 can map the coordinate information of the touch input received from the first input unit 410 to the pressure information received from the second input unit 420. The first input unit controller 431 can produce the pressure information based on the mapping information between the coordinate information and the pressure information of the touch input and the area information. The first input unit controller 431 can forward the produced pressure information to the AP 440.

When generating the pressure table, the first input unit controller 431 can identify the pressure information corresponding to all or some of the nodes of the second input unit 420.

Until the first input unit controller 431 generates the pressure table, the pressure information corresponding to the coordinate information collected by the first input unit 410 may be associated with the pressure information having the minimum value. Until the pressure table is generated, the first input unit controller 431 can forward the AP 440 the pressure information having the minimum value corresponding to the coordinate information collected by the first input unit 410.

The AP 440 can classify the touch input received from the first input unit 410 and the second input unit 430. Specifically, the AP 440 may determine whether the touch input received from the first input unit 410 and the second input unit 430 includes pressure information, does not include pressure information, or includes pressure information lower than a threshold value. The AP 440 can operate based on the classified touch input.

The first input unit controller 431 can produce accurate pressure information using the generated pressure table. This is described later in connection with FIG. 8.

The first input unit controller 431 may transmit the second input unit controller 432 mode information or a command for controlling the second input unit 420. The second input unit controller 432 can control the second input unit 420 according to the mode information or command received from the first input unit controller 431. The second input unit 420 may collect coordinate information and/or pressure information of the touch input according to the mode information or command received from the second input unit controller 432. The second input unit 420 may forward the collected coordinate information and/or the pressure information of the touch input to the second input unit controller 432. The second input unit controller 432 may forward the coordinate information and/or the pressure information of the touch input collected by the second input unit 420 to the first input unit controller 431 or the AP 440.

The first input unit controller 431 can receive notification of specific mode information from the AP 440 or the first input unit 410. The specific mode may mean, for example, that touch information cannot be received from the first input unit 410 or the first input unit 410 is not used according to a user command. For example, when the first input unit 410 is a capacitive touch sensor, if water contacts the first input unit 410 or a touch input is made on the first input unit 410 through an insulator, touch information cannot be received from the first input unit 410. Information about the specific mode may be collected not only by the first input unit 410 but also by another sensor or unit included in the electronic device 400, such as a sensor or unit for measuring air pressure or water pressure.

The electronic device 400 may have one or more modes related to touch input reception. For example, the mode for touch input may be a normal mode, a special mode, and a raw data mode. In the normal mode, the coordinate information and/or the pressure information of the touch input may be collected by the first input unit 410 and the second input unit 420 and be processed by the AP 440. The special mode may be, for example, a water mode. In the special mode, touch information cannot be received from the first input unit 410 or the first input unit 410 is not used according to a user command.

In the raw data mode, it is possible to track the situation where a pressure higher than a first threshold is sensed by the second input unit 420. The first threshold may be the base line for the pressure value.

Figure 5:
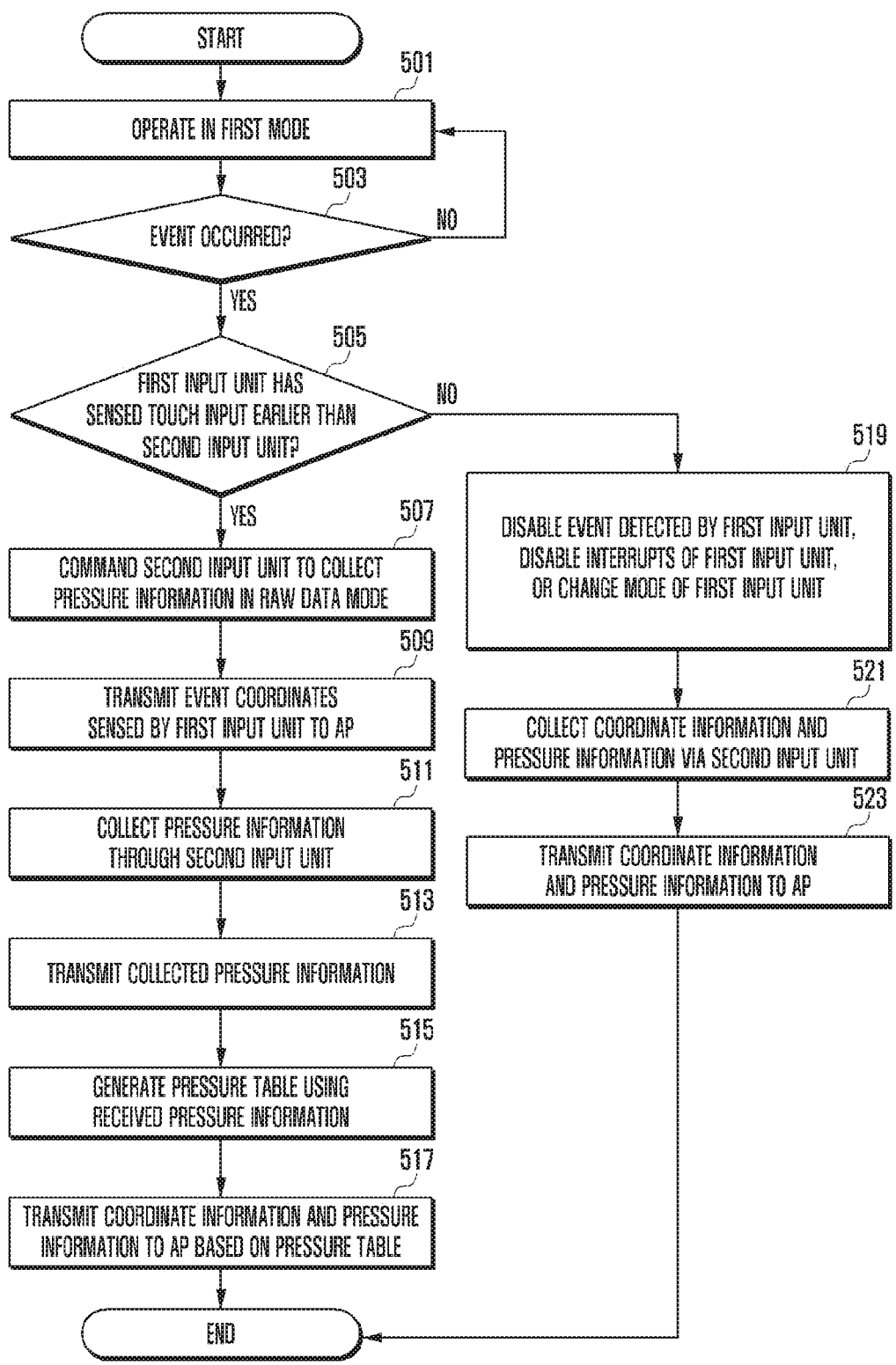
FIG. 5 is a flowchart of a touch input sensing method for the electronic device according to various embodiments of the present invention.

FIG. 5 is a flowchart of a touch input sensing method for the electronic device 400 according to various embodiments of the present invention.

At operation 501, the electronic device 400 may operate in the first mode. The first mode may be, for example, the normal mode.

At operation 503, the first input unit controller 431 or the second input unit controller 432 may determine whether an event (e.g., a touch input) has occurred at the first input unit 410 or the second input unit 420.

In various embodiments, the input/output subsystem 430 may determine whether an event (e.g., a touch input) has occurred at the first input unit 410 or the second input unit 420 at operation 503.

Since the first input unit 410 detects the touch input via interrupts, the first input unit controller 431 can determine whether an event has occurred. In various embodiments, since the first input unit 410 detects the touch input via interrupts, the input/output subsystem 430 can determine whether an event has occurred.

If no event has occurred, the procedure returns to operation 501 at which the electronic device 400 operates in the first mode.

If an event has occurred, the procedure proceeds to operation 505.

At operation 505, the electronic device 400 (the first input unit controller 431) may determine whether the first input unit 410 has detected the event (e.g., touch input) earlier than the second input unit 420.

In various embodiments, the input/output subsystem 430 can determine whether the first input unit 410 has detected the event (e.g., touch input) earlier than the second input unit 420.

If the first input unit 410 has detected the event earlier than the second input unit 420, the procedure proceeds to operation 507.

At operation 507, the first input unit controller 431 may command the second input unit 420 to collect pressure information in the raw data mode.

In various embodiments, the input/output subsystem 430 may command the second input unit 420 to collect pressure information in the raw data mode at operation 507.

In various embodiments, the first input unit controller 431 may command the second input unit controller 432 to collect pressure information in the raw data mode at operation 507. Upon receiving the raw data mode command from the first input unit controller 431, the second input unit controller 432 may command the second input unit 420 to collect pressure information in the raw data mode.

At operation 509, the first input unit controller 431 may transmit the AP 440 the coordinate information of the event (e.g., touch input) detected by the first input unit 410. In various embodiments, the first input unit controller 431 may transmit the AP 440 the coordinate information and pressure information of the event (e.g., touch input) detected by the first input unit 410 at operation 509. Here, the pressure information transmitted to the AP 440 may correspond to the minimum pressure value.

In various embodiments, the input/output subsystem 430 may transmit the AP 440 the coordinate information and pressure information of the event (e.g., touch input) detected by the first input unit 410 at operation 509. Here, the pressure information transmitted to the AP 440 may correspond to the minimum pressure value.

At operation 511, the electronic device 400 may collect pressure information through the second input unit 420.

At operation 513, the second input unit controller 432 may transmit the first input unit controller 431 the pressure information collected by the second input unit 420.

In various embodiments, the electronic device 400 (the input/output subsystem 430) may receive the pressure information collected by the second input unit 420 at operation 513.

At operation 515, the first input unit controller 431 may generate the pressure table by mapping pressure information corresponding to the node of the second input unit 420 with the pressure information received from the second input unit controller 432.

In various embodiments, the input/output subsystem 430 may generate the pressure table by mapping pressure information corresponding to the node of the second input unit 420 with the pressure information at operation 515.

At operation 517, the electronic device 400 (the first input unit controller 431) may map the pressure table with the event coordinate information collected by the first input unit 410, and transmit the coordinate information and pressure information to the AP 440.

In various embodiments, the input/output subsystem 430 may map the pressure table with the event coordinate information collected by the first input unit 410, and transmit the coordinate information and pressure information to the AP 440 at operation 517.

If the second input unit 420 has detected the event earlier than the first input unit 410 at operation 505, the procedure proceeds to operation 519.

At operation 519, the first input unit controller 431 may disable delivery of the event (e.g., touch input) detected by the first input unit 410, and may change the mode of the first input unit 410 so that no event is generated.

In various embodiments, the input/output subsystem 430 may disable processing of the event (e.g., touch input) detected by the first input unit 410, disable interrupts of the first input unit 410, or change the mode of the first input unit 410 so that no event is generated at operation 519.

In various embodiments, the input/output subsystem 430 may assign priorities to events handled in the AP 440 in consideration of the processes of the first input unit 410 and the second input unit 420 at operation 519.

In various embodiments, the input/output subsystem 430 may ignore some events satisfying a specific condition at operation 519.

At operation 521, the electronic device 400 may collect coordinate information and pressure information via the second input unit 420.

At operation 523, the second input unit controller 432 may transmit the AP 440 the coordinate information and pressure information collected via the second input unit 420.

In various embodiments, the input/output subsystem 430 may transmit the AP 440 the coordinate information and pressure information collected via the second input unit 420 at operation 523.

Figure 6:
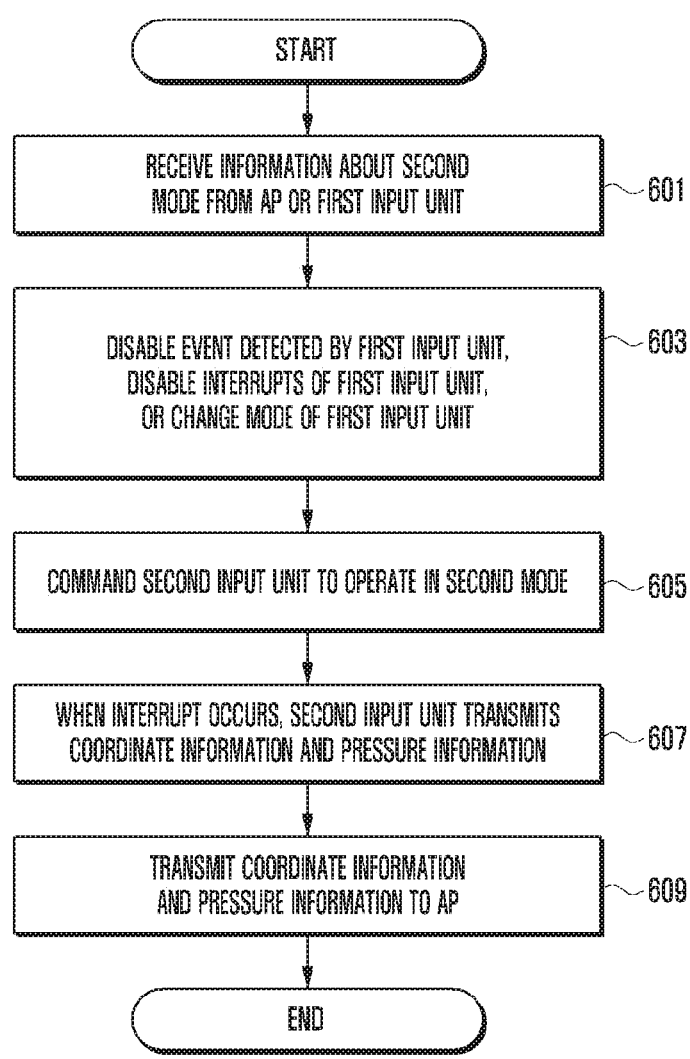
FIG. 6 is a flowchart of a touch input sensing method for the electronic device according to various embodiments of the present invention.

FIG. 6 is a flowchart of a touch input sensing method for the electronic device 400 according to various embodiments of the present invention.

At operation 601, the first input unit controller 431 may receive information about the second mode from the AP 440 or the first input unit 410. The second mode may be the special mode. The information on the second mode received from the AP 440 may be a notification according to a user command. When the first input unit 410 senses a contact with water or senses touch input through an insulator, it may notify information on the second mode to the first input unit controller 431.

In various embodiments, the input/output subsystem 430 may receive information about the second mode from the AP 440 or the first input unit 410 at operation 601.

At operation 603, the electronic device 400 may control the first input unit controller 431 to disable delivery of the event detected by the first input unit 410, disable interrupts of the first input unit 410, or change the mode of the first input unit 410 so that no event is generated.

In various embodiments, the electronic device 400 may control the input/output subsystem 430 to disable delivery of the event detected by the first input unit 410, disable interrupts of the first input unit 410, or change the mode of the first input unit 410 so that no event is generated at operation 603.

In various embodiments, the electronic device 400 may assign priorities to events handled in the AP 440 in consideration of the processes of the first input unit 410 and the second input unit 420 at operation 603.

In various embodiments, the electronic device 400 may ignore some events satisfying a specific condition at operation 603.

At operation 605, the first input unit controller 431 may transmit a second mode operation command to the second input unit controller 432, and the second input unit controller 432 may forward the second mode operation command to the second input unit 420.

In various embodiments, the input/output subsystem 430 may transmit the second mode operation command to the second input unit 420 at operation 605.

At operation 607, when an interrupt occurs, the second input unit 420 may transmit coordinate information and pressure information to the second input unit controller 431.

At operation 609, the second input unit controller 431 may forward the AP 440 the coordinate information and pressure information received from the second input unit 420.

In various embodiments, the input/output subsystem 430 may forward the AP 440 the coordinate information and pressure information received from the second input unit 420 at operation 609.

Figure 7A:
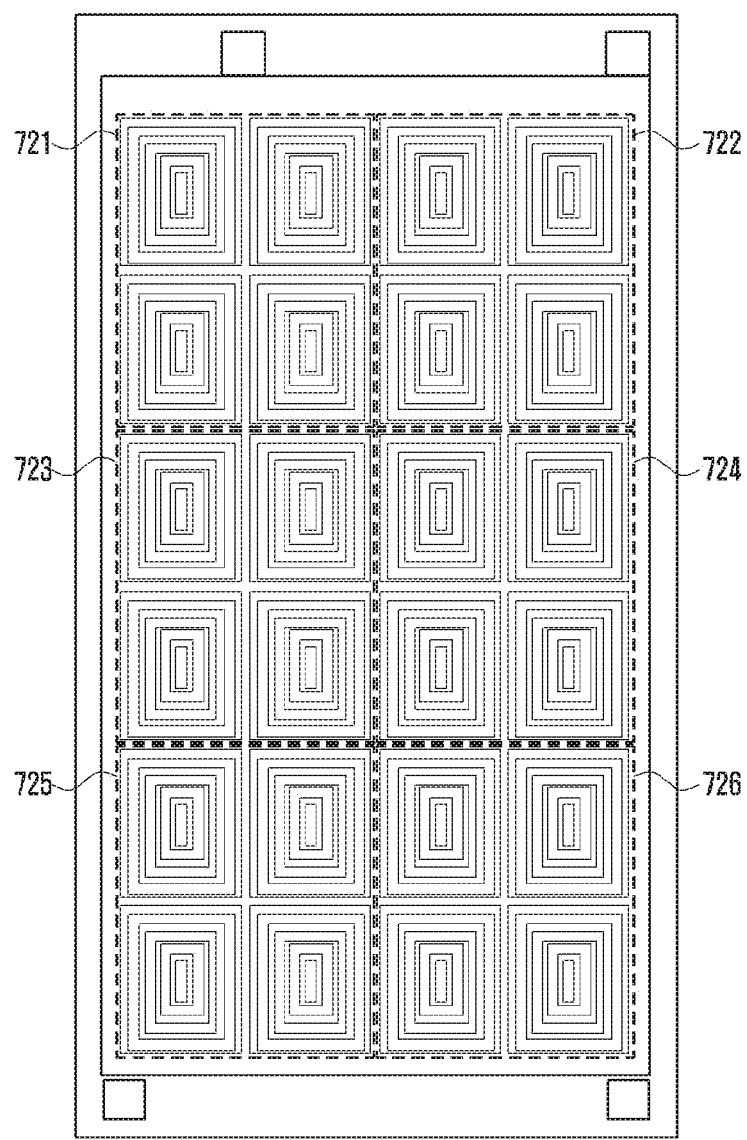
FIG. 7A shows an example of a pattern for arranging a pressure sensor of a second input unit.

FIG. 7A shows an example of a pattern for arranging a pressure sensor of the second input unit 420.

In FIG. 7A, the pressure sensors are arranged in square patterns (self-capacitance mode). In FIG. 7A, nodes or electrodes having different sizes are formed in a single rectangular pattern, and these rectangular patterns are arranged in a 4 by 6 form. However, the present invention is not limited to the arrangement of the pressure sensor shown in FIG. 7A, but the pressure sensors may be arranged in various types of patterns such as a circular pattern.

Figure 7B:
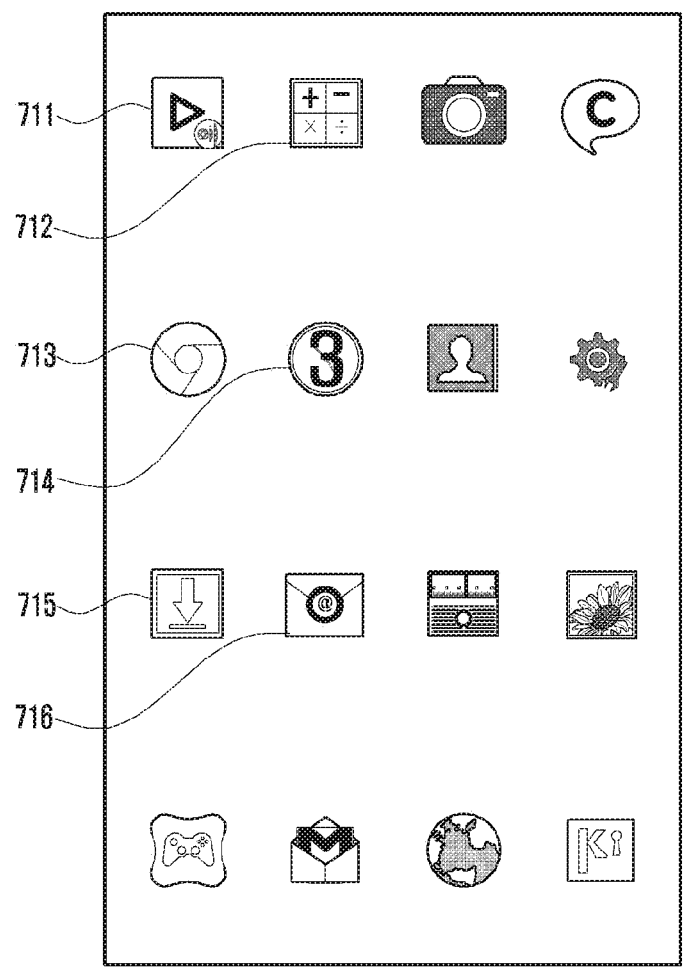
FIG. 7B depicts a user interface when the electronic device operates in the normal mode.

FIG. 7B shows a list of icons 711 to 716, output on the display of the electronic device, corresponding to individual applications according to an embodiment of the present invention. FIG. 7B depicts the user interface when the electronic device 400 operates in the normal mode.

In touch sensing, the resolution of the second input unit 420 may be lower than that of the first input unit 410. That is, the accuracy of recognizing the touch location using only the second input unit 420 may be lower than the accuracy of sensing the touch location using the first input unit 410.

Hence, in one embodiment, while the touch sensor and/or the pen sensor fail to detect a touch due to an external object for a preset time duration, the pressure sensor detects pressure caused by an external object, the electronic device may change the screen output on the display.

In one embodiment, when the mode designated by the user is executed, the electronic device can change the screen output on the display. For example, when the waterproof mode designated by the user is executed, the screen output on the display can be changed. As another example, when the pressure sensed by the pressure sensor becomes higher, the screen output on the display may be changed.

In one embodiment, the processor can change the screen output on the display by changing the size of icons or adjusting the number of icons to be output.

The screen output on the display can be changed differently based on the arrangement of the pressure sensor. This is because when the touch location is detected by using the pressure sensor, the accuracy varies depending on the position of the pressure sensor. In particular, the closer the touch location is to the position where the pressure sensor is present, the higher the accuracy can be.

Figure 7C:
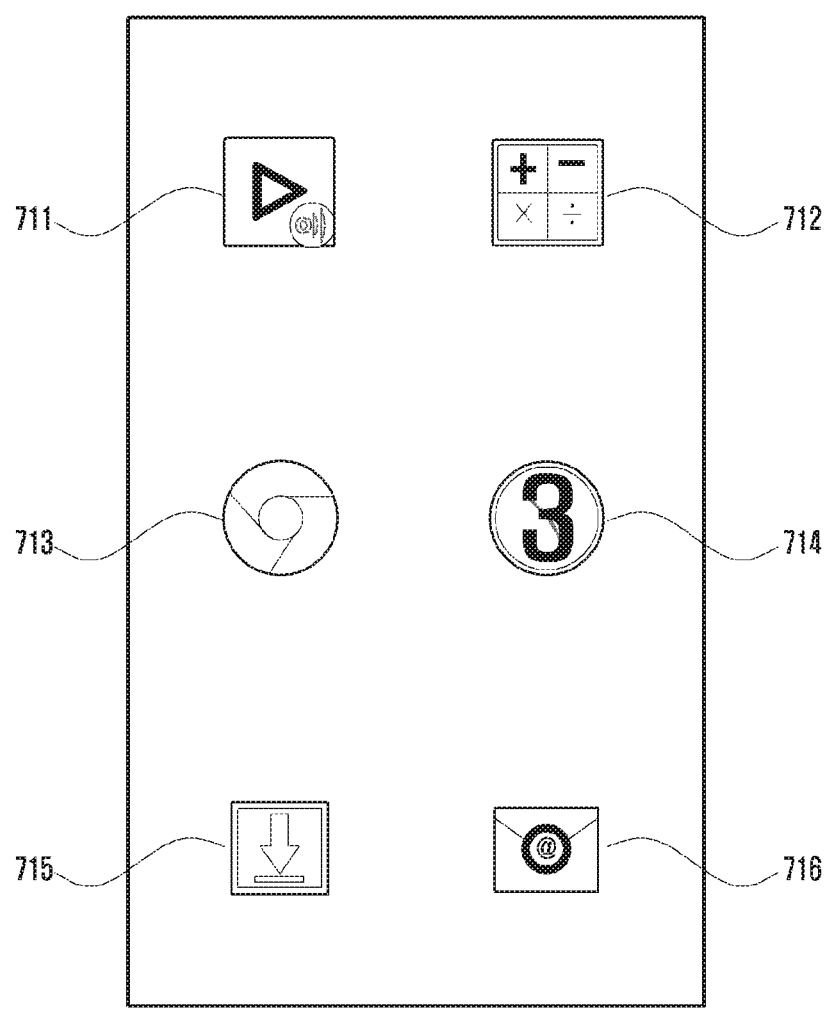
FIG. 7C depicts a user interface when the electronic device enters the special mode.

FIG. 7C shows an example of arranging the icons 711 to 716 associated with individual applications at positions on the display corresponding to the positions of the pressure sensors shown in FIG. 7A. FIG. 7C depicts a user interface when the electronic device 400 enters the special mode.

In FIG. 7C, the icon 711 is placed at a position on the display corresponding to the position where the pressure sensor 721 is present. Similarly, the icon 712 is placed at a position on the display corresponding to the position where the pressure sensor 722 is present.

Figure 8:
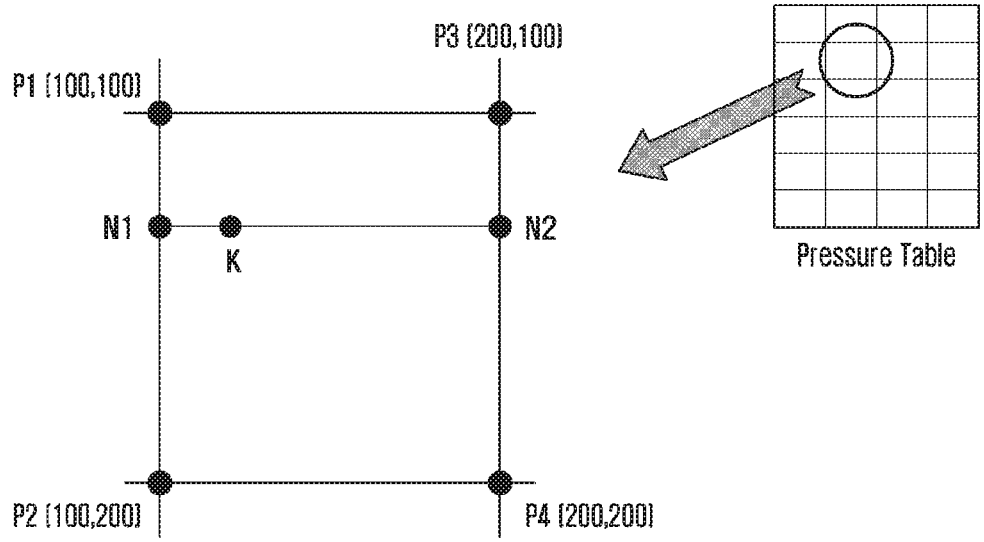
FIG. 8 illustrates an operation of producing pressure information using a pressure table.

FIG. 8 illustrates an operation of producing pressure information using a pressure table.

When the position information of each node of the second input unit 420 is known, the first input unit controller 431 or the AP 440 can recognize the information about one or more nodes close to the touch coordinates by using the coordinate information of the touch input obtained by the first input unit 410.

The accuracy of the pressure information can be increased by using at least one adjacent node. The at least one adjacent node may be four nodes, two nodes (for outer region), or one node.

For example, the pressure information can be calculated using four adjacent nodes as follows.

$$N1=P1+(P2-P)*(K\_Y-P1\_Y)/(P2\_Y-P1\_Y)$$

$$N2=P3+(P4-P3)*(K\_Y-P3\_Y)/(P4\_Y-P3\_Y)$$

$$K=N1+(N2-N1)*(K\_X-P1\_X)/(P2\_X-P1\_X)$$

The pressure table can be used to identify accurate pressure information.

In the description, the term "module" may refer to a certain unit that includes one of hardware, software and firmware or any combination thereof. The term "module" may be used interchangeably with the term "unit", "logic", "logical block", "component", or "circuit", for example. The module may be the minimum unit of a single-bodied component or a part thereof. The module may be realized mechanically or electronically. For example, the module may include at least one of an ASIC (application-specific integrated circuit) chip, FPGA (field-programmable gate array), and programmable-logic device, which have been known or are to be developed in the future. At least a part of the device (e.g. modules or functions) or the method (e.g. operations) according to various embodiments may be implemented as instructions in the form of a program module, which can be stored in a computer readable storage medium (e.g. memory 130). When the instructions are executed by a processor (e.g. processor 120), the processor may carry out functions corresponding to the instructions. The computer readable storage media may include magnetic media such as a hard disk and floppy disk, optical media such as a CD-ROM and DVD, magneto-optical media such as a floptical disk, and memory devices. The instructions may include codes produced by compilers and codes executable through interpreters. A module or program module may include at least one of the components described above. An existing component of the module may be removed or a new component may be added to the module. Operations supported by a module, program module, or another component may be carried out in sequence, in parallel, by repetition, or heuristically. Some operations may be executed in a different order or may be omitted, and a new operation may be added.

The invention claimed is:

1. A method of touch input sensing for an electronic device, the method comprising:
    operating in a first mode;
    determining whether a first input unit has sensed a touch input earlier than a second input unit;
    sending, if the first input unit has sensed a touch input earlier than the second input unit, a command to the second input unit to collect pressure information in a raw data mode;
    collecting pressure information via the second input unit according to the command;
    generating a pressure table using the collected pressure information;
    mapping the pressure table and coordinate information sensed by the first input unit;
    transmitting the coordinate information and the pressure information to an application processor (AP);
    when the first input unit senses a contact with water or senses a touch input through an insulator, receiving information about a second mode of the first input unit;
    disabling the touch input collected by the first input unit;
    sending a command to the second input unit to operate in the second mode;
    collecting coordinate information and pressure information via the second input unit when an interrupt occurs; and
    transmitting, to the AP, the coordinate information and the pressure information collected via the second input unit,
    wherein graphical user interfaces (GUIs) are displayed on a display corresponding to a position where the second input unit is present in the second mode.

2. The method of claim 1, further comprising:
    performing, if the second input unit has sensed a touch input earlier than the first input unit, at least one of disabling processing of coordinate information sensed by the first input unit, disabling interrupts of the first input unit, and changing the mode of the first input unit to prevent event generation;
    collecting coordinate information and pressure information of the touch input using the second input unit;
    transmitting the AP the coordinate information and pressure information of the touch input detected by the second input unit;
    assigning priorities to events handled in the AP in consideration of the processes of the first input unit and the second input unit; and
    ignoring some events satisfying a specific condition.

3. The method of claim 1, wherein determining whether the first input unit has sensed the touch input earlier than the second input unit comprises:
    checking occurrence of a touch input, and determining, if a touch input has occurred, whether the first input unit has sensed the touch input earlier than the second input unit,
    wherein the first mode is a mode where the touch input is received through the first input unit and the second input unit.

4. The method of claim 1, wherein collecting pressure information in the raw data mode corresponds to tracking whether a pressure higher than a threshold is sensed by the second input unit.

5. The method of claim 1, wherein the first input unit and the second input unit sense a touch input through an interrupt.

6. The method of claim 1, further comprising:
    receiving information about a second mode from the AP, wherein the second mode is a mode where the first input unit is disabled from collecting touch inputs.

7. An electronic device comprising:
    a first input unit;
    a second input unit;
    an application processor (AP); and
    an input and output subsystem,
    wherein the input and output subsystem is configured to:
        operate in a first mode,
        determine whether the first input unit has sensed a touch input earlier than the second input unit,
        send, if the first input unit has sensed a touch input earlier than the second input unit, a command to the second input unit to collect pressure information in a raw data mode, control the second input unit to collect pressure information according to the command,
generate a pressure table using the collected pressure information,
map the pressure table and coordinate information sensed by the first input unit and transmit the coordinate information and the pressure information to the AP,
when the first input unit senses a contact with water or senses a touch input through an insulator, receive information about a second mode of the first input unit,
disable the touch input collected by the first input unit,
send a command to the second input unit to operate in the second mode,
collect coordinate information and pressure information via the second input unit when an interrupt occurs, and
transmit, to the AP, the coordinate information and the pressure information collected via the second input unit,
wherein graphical user interfaces (GUIs) are displayed on a display corresponding to a position where the second input unit is present in the second mode.

8. The electronic device of claim 7, wherein the input and output subsystem is configured to:
perform, if the second input unit has sensed a touch input earlier than the first input unit, at least one of disabling processing of coordinate information sensed by the first input unit, disabling interrupts of the first input unit, and changing the mode of the first input unit to prevent event generation;
control the second input unit to collect coordinate information and pressure information of the touch input;
transmit the AP the coordinate information and pressure information of the touch input detected by the second input unit;
assign priorities to events handled in the AP in consideration of the processes of the first input unit and the second input unit; and
ignore some events satisfying a specific condition.

9. The electronic device of claim 7, wherein the input and output subsystem is configured to check occurrence of a touch input and determine, if a touch input has occurred, whether the first input unit has sensed the touch input earlier than the second input unit, and wherein the first mode is a mode where the touch input is received through the first input unit and the second input unit.

10. The electronic device of claim 7, wherein the raw data mode corresponds to tracking whether a pressure higher than a threshold is sensed by the second input unit.

11. The electronic device of claim 7, wherein the first input unit and the second input unit are configured to sense a touch input through an interrupt, wherein the first input unit comprises a touch sensor, and wherein the second input unit comprises a pressure sensor.

12. The electronic device of claim 7, wherein the input and output subsystem is configured to receive information about a second mode from the AP, and
wherein the second mode is a mode where the first input unit is disabled from collecting touch inputs.

13. The electronic device of claim 7, wherein the input and output subsystem is configured to determine whether the touch input received from the first input unit and the second input unit includes pressure information, does not include pressure information, or includes pressure information lower than a threshold value.

14. The electronic device of claim 7, wherein the input and output subsystem is configured to transmit the AP pressure information that is produced by using pressure information mapped to coordinate information and area information sensed by the first input unit.

* * * * *